(12) United States Patent
Lal et al.

(10) Patent No.: US 12,536,265 B2
(45) Date of Patent: Jan. 27, 2026

(54) SYSTEMS AND METHODS FOR PERFORMING NON-CONTACT AUTHORIZATION VERIFICATION FOR ACCESS TO A NETWORK

(71) Applicant: BANK OF AMERICA CORPORATION, Charlotte, NC (US)

(72) Inventors: Geetika Lal, New Delhi (IN); Sandeep Kumar Chauhan, Hyderabad (IN); Ramarao Gaddam, Hyderabad (IN); Anil Gajula, Hyderabad (IN); Koteswara Rao Venkata Magham, Hyderabad (IN); Suman Matury, Hyderabad (IN); Santosh Kumar Miryala, Hyderabad (IN); Ravikiran Subramanya Rao, Hyderabad (IN); Yash Sharma, Delhi (IN); Sudarshan Veeramreddy, Hyderabad (IN); Durgesh Singh Yadav, Gautam Buddha Nagar (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 247 days.

(21) Appl. No.: 17/867,291

(22) Filed: Jul. 18, 2022

(65) Prior Publication Data
US 2024/0020372 A1 Jan. 18, 2024

(51) Int. Cl.
*G06F 21/33* (2013.01)
*G06F 3/01* (2006.01)

(52) U.S. Cl.
CPC .............. *G06F 21/33* (2013.01); *G06F 3/017* (2013.01)

(58) Field of Classification Search
CPC ................................. G06F 21/33; G06F 3/017
See application file for complete search history.

(56) References Cited

U.S. PATENT DOCUMENTS

| | | |
|---|---|---|
| 7,584,885 B1 | 9/2009 | Douglass |
| 7,841,515 B2 | 11/2010 | Cucinotta |
| 7,891,554 B2 | 2/2011 | Horan et al. |
| 7,992,778 B1 | 8/2011 | Ramachandran et al. |
| 9,038,891 B2 | 5/2015 | Lewis et al. |
| 9,183,554 B1 * | 11/2015 | Courtright ............. G06T 11/60 |
| 9,189,786 B2 | 11/2015 | Roberts et al. |
| 9,355,531 B2 | 5/2016 | Graef et al. |
| 9,368,000 B2 | 6/2016 | Ramachandran et al. |
| 9,378,629 B2 | 6/2016 | Lewis et al. |
| 9,595,026 B2 | 3/2017 | Lewis et al. |
| 9,767,446 B2 | 9/2017 | Cooke et al. |

(Continued)

*Primary Examiner* — David J Pearson
*Assistant Examiner* — Daniel Elahian
(74) *Attorney, Agent, or Firm* — Moore & Van Allen PLLC; Nicholas C. Russell

(57) ABSTRACT

Embodiments of the present invention removes the need for a physical interaction between a user and a user device such that the user can gesture at a certain distance from the machine in order to enter their personal verification information. This invention provides a seamless way for the user to authenticate themselves. The present invention utilizes various intelligent systems for image, video, and proximity data analysis in order to provide an intuitive touchless experience when interacting with a resource dispensing machine or resource activity processing machine to conduct various activities related to user resource accounts.

20 Claims, 3 Drawing Sheets

(56) References Cited

U.S. PATENT DOCUMENTS

| | | | |
|---|---|---|---|
| 9,801,058 B2 | 10/2017 | Tali et al. | |
| 9,911,104 B2 | 3/2018 | Konecny et al. | |
| 9,922,332 B2 | 3/2018 | Sant'Anselmo | |
| 9,990,614 B2 | 6/2018 | Jenkins et al. | |
| 10,304,057 B1 | 5/2019 | Powell et al. | |
| 11,039,314 B2 | 6/2021 | Tali et al. | |
| 11,334,863 B2 | 5/2022 | Morgan et al. | |
| 2001/0016819 A1* | 8/2001 | Kolls | G06Q 10/10 705/14.1 |
| 2005/0222961 A1 | 10/2005 | Staib et al. | |
| 2009/0160761 A1* | 6/2009 | Moosavi | G06F 3/0237 341/20 |
| 2013/0229345 A1* | 9/2013 | Day | G06F 3/017 345/158 |
| 2015/0324568 A1 | 11/2015 | Publicover et al. | |
| 2016/0109954 A1* | 4/2016 | Harris | G06V 20/20 345/156 |
| 2016/0205337 A1* | 7/2016 | Cho | G06F 3/1454 348/734 |
| 2018/0032141 A1* | 2/2018 | Tanabe | G06F 3/0304 |
| 2019/0147418 A1* | 5/2019 | Kuribara | G07F 19/20 705/64 |
| 2020/0249752 A1* | 8/2020 | Parshionikar | G06F 3/016 |
| 2020/0275271 A1* | 8/2020 | Firehammer | H04W 12/065 |
| 2020/0302422 A1 | 9/2020 | Nonaka | |
| 2020/0410477 A1 | 12/2020 | Terra et al. | |
| 2021/0334779 A1 | 10/2021 | Goodwin, III et al. | |
| 2022/0076233 A1 | 3/2022 | Sedgwick et al. | |
| 2022/0108303 A1 | 4/2022 | Dunjic et al. | |
| 2022/0253824 A1* | 8/2022 | Gupta | G06Q 20/321 |
| 2023/0419513 A1* | 12/2023 | Dutta Choudhury | G06F 3/017 |

* cited by examiner

SYSTEMS AND METHODS FOR PERFORMING NON-CONTACT AUTHORIZATION VERIFICATION FOR ACCESS TO A NETWORK

FIELD OF THE INVENTION

The present invention generally relates to the field of intuitive solutions for performing actions related to network and resource access. There is a need for an improved authentication system which allows a user to verify their identity in a touchless manner when interacting with a resource dispensing terminal.

BACKGROUND

In conventional systems for resource dispensing, users are required to enter a personal identification number (PIN) at the physical location where resources are to be dispensed, such as at an automated teller machine (ATM). There is a need for a more seamless and intuitive solution for entering user authentication information.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing a system to remove the need for a physical interaction between the user and the ATM such that the user can gesture at a certain distance from the machine in order to enter their personal verification information. This invention provides a more seamless and hygienic way for the user to authenticate themselves. The present invention utilizes various intelligent systems for image and video data analysis in order to provide a touchless experience when interacting with an ATM to conduct various activities related to user resource accounts.

For sample, illustrative purposes, system environments will be summarized. Generally, the invention may comprise the steps of: identify insertion of a resource instrument in a user device; scan the resource instrument to determine a resource account number and associated user identity; transmit instructions to the user device to cause the user device to display a user gesture input prompt; simultaneous with the display of the user gesture input prompt, activate one or more data capture sensors on the user device; validate or reject a user gesture input recognized by the one or more data capture sensors on the user device; and based on a validation of the user gesture input, process one or more resource activities.

In some embodiments, the invention is further configured to transmit instructions to the user device to cause the user device to display an option to reset a user gesture input process by the user waving their hand over a numerical keypad.

In other embodiments, the invention is further configured to transmit instructions to the user device to cause the user device to display a virtual alphanumeric keypad.

In still further embodiments, based on rejection of the user gesture input, the system is further configured to reset the user gesture input prompt and initiate a recalibration of the one or more data capture sensors on the user device.

In some embodiments, the one or more data capture sensors further comprise video sensors, camera sensors, proximity sensors, and infrared sensors.

In other embodiments, the one or more data capture sensors further comprise one or more proximity sensors coinciding with horizontal and vertical axis coordinates of a single alphanumeric character of a physical keypad.

In some embodiments, the invention is further configured to store user gesture input data in a user configuration associated with the resource account number and the user identity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
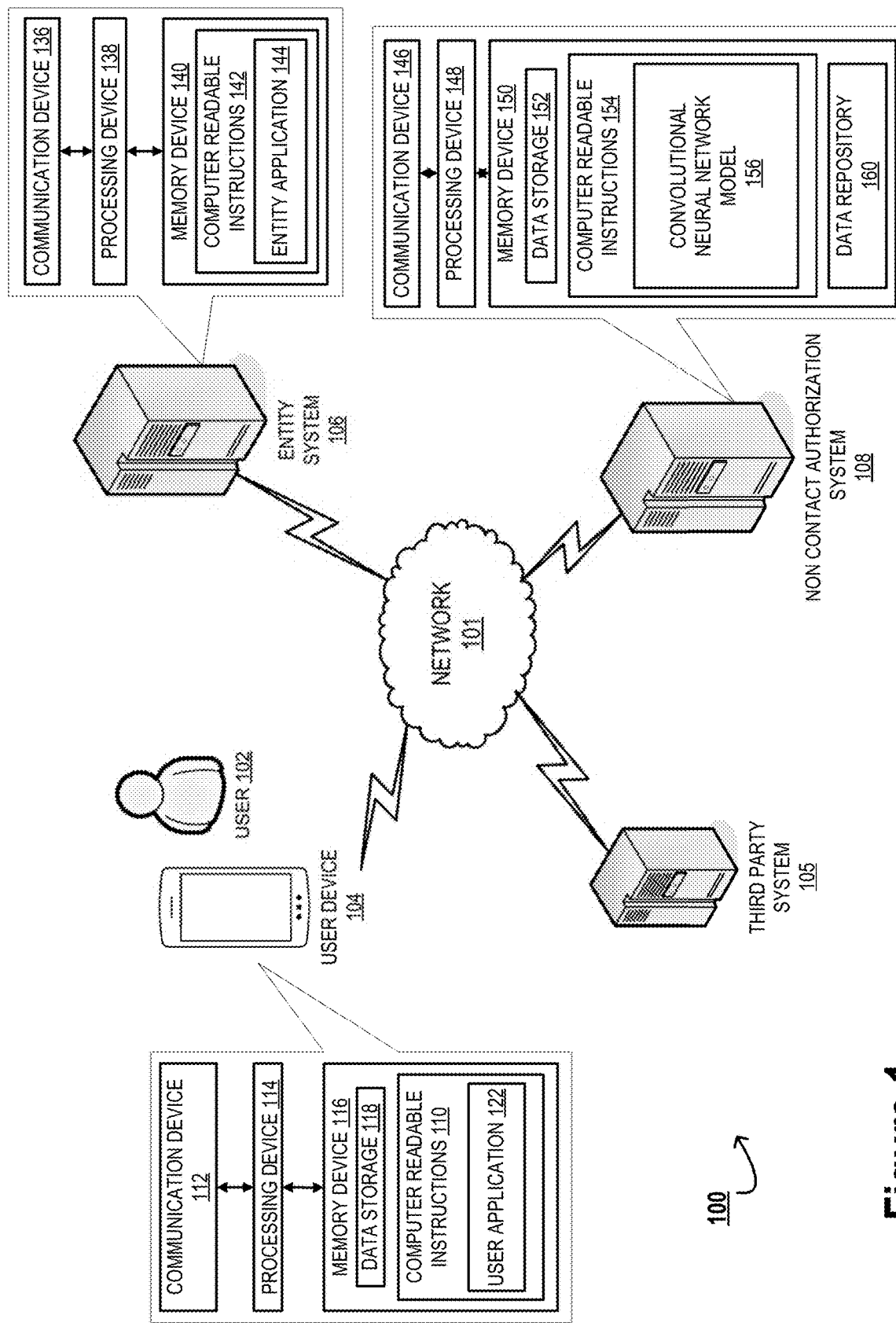
Figure 2:
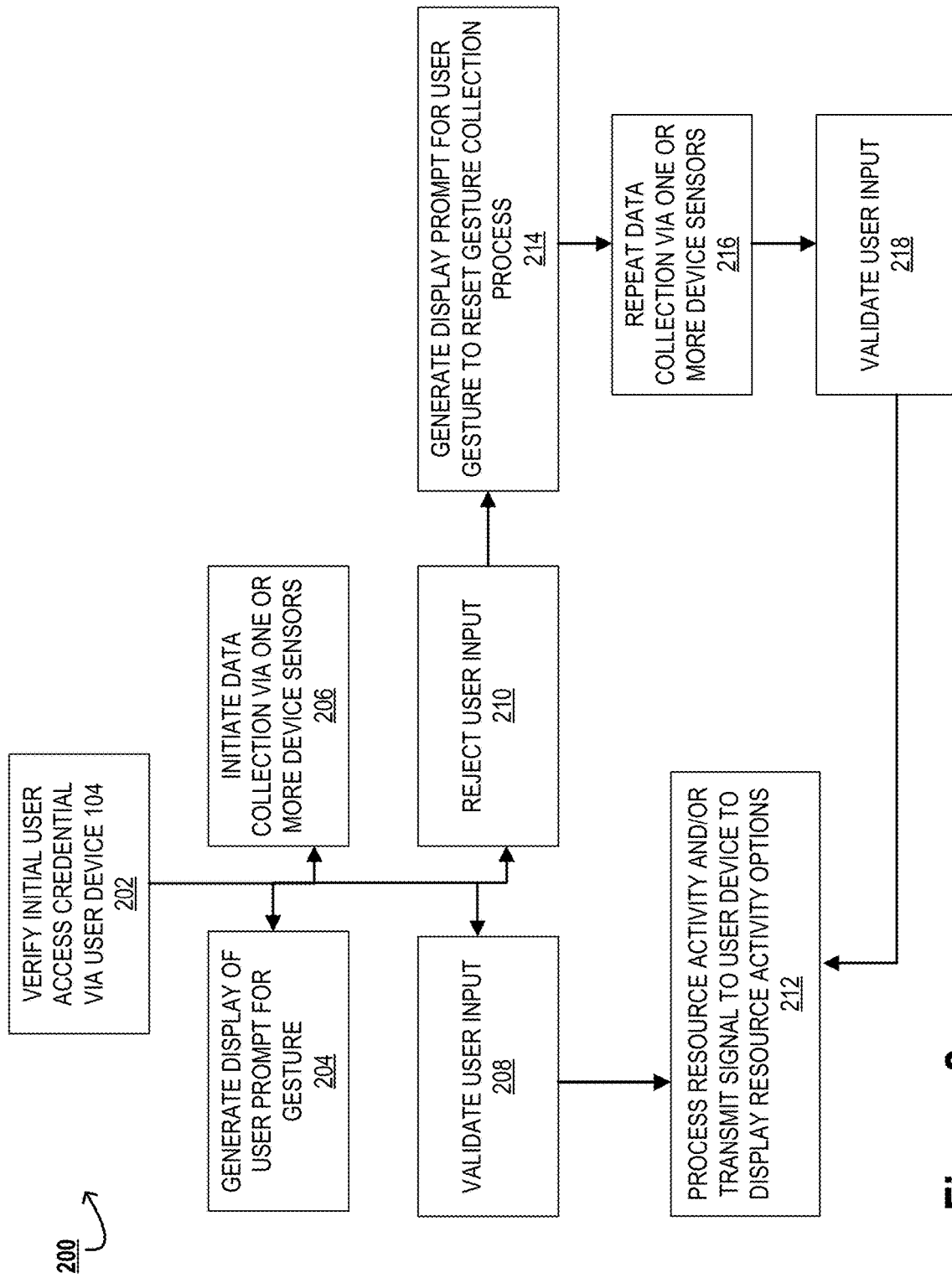
Figure 3:
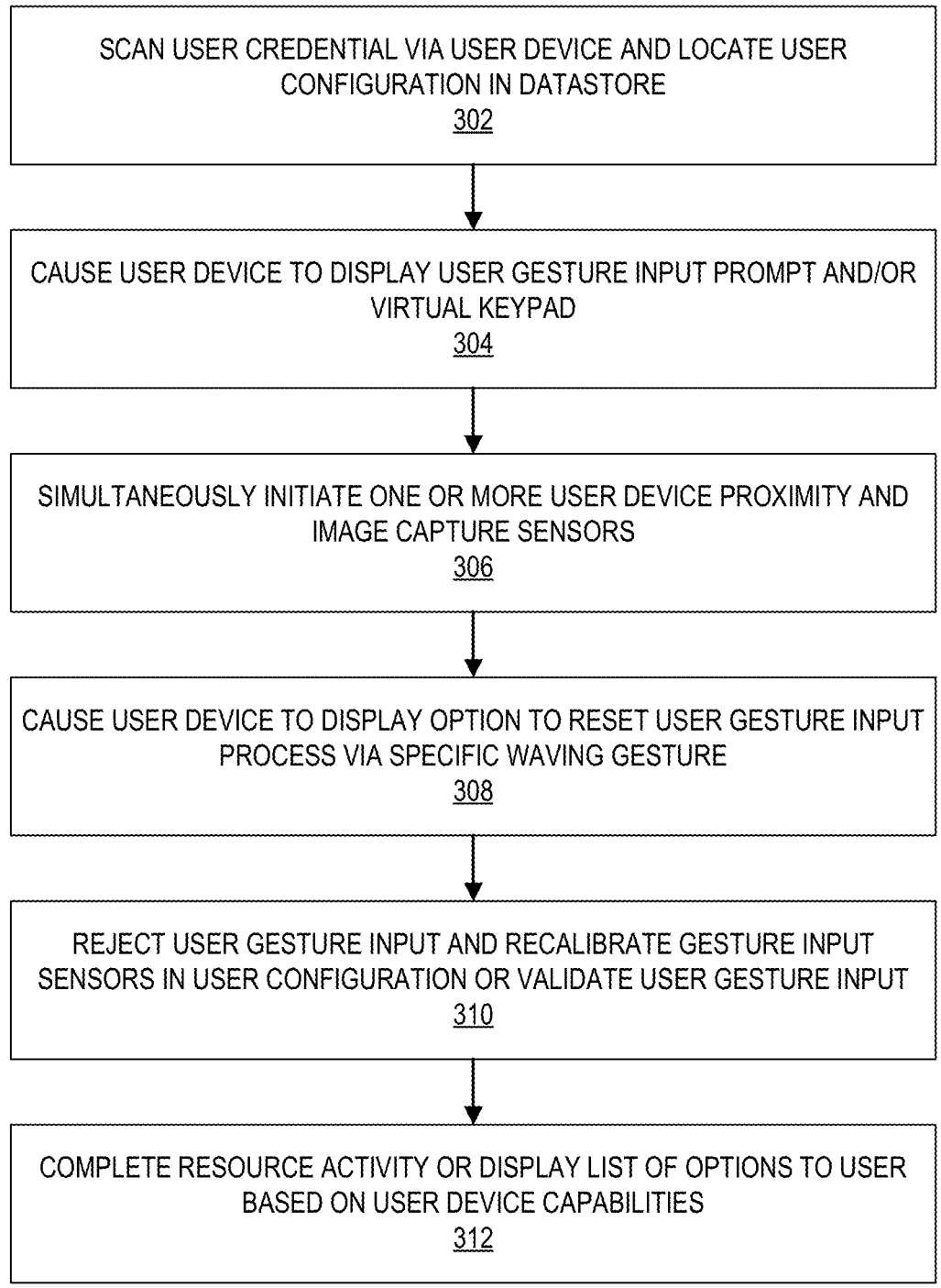

Having thus described embodiments of the invention in general terms, reference will now be made to the accompanying drawings, wherein:

FIG. 1 depicts a non-contact authorization verification system environment 100, in accordance with one embodiment of the present invention;

FIG. 2 depicts a non-contact authorization verification process 200, in accordance with one embodiment of the present invention; and FIG. 3 depicts a process flow 300 for user resource activity interaction, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity.

It is understood that "user devices," such as user device(s) 140, may represent various forms of electronic devices, including user input devices such as personal digital assistants, cellular telephones, smartphones, laptops, desktops, webcams, microphones, scanners, printers, projectors, speakers, CD/DVD-drives, and/or the like, merchant input devices such as point-of-sale (POS) devices, electronic payment kiosks, and/or the like, resource dispensing devices (e.g., automated teller machine (ATM)), and/or edge devices such as routers, routing switches, integrated access devices (IAD), and/or the like. In the case of user device 140 representing an ATM, the device may contain specialized equipment such as video sensors, camera sensors, proximity sensors, infrared sensors, or the like, which enable the user 102 to enter information in a touchless manner.

As used herein, a "user interface" or "UI" may be an interface for user-machine interaction. In some embodiments, such as in the case of a user interaction with an ATM, the user interface may allow for interaction without physical touch of the user device, such as gesturing. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety. In some embodiments, the GUI may respond intelligently to user gestures via the user devices ability to record or recognize user movements near the device, over a keypad, over a virtually rendered keypad on the GUI, or the like.

FIG. 1 depicts non-contact authorization system environment 100, in accordance with one embodiment of the present invention. As illustrated in FIG. 1, an non-contact authorization system 108 is operatively coupled, via a network 101 to a user device 104, to an entity system 106, and to a third party system 105. In this way, the non-contact authorization system 108 can send information to and receive information from the user device 104, the entity system 106, and the third party system 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the non-contact authorization system 108, is configured for receiving user device data and user data, discerning or inferring situational needs of the user, and implementing an intelligent dynamic screen protection process via the convolutional encoding and decoding of image data using one or more steganographic functions for the selective obfuscation of graphical image data.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide images for analysis, recognition and extraction, query the non-contact authorization system 108 for identified attributes, set parameters and metrics for data analysis, and/or receive/utilize centralized database information created and disseminated by the non-contact authorization system 108. As such, in some embodiments, the user 102 may be associated with the entity and/or a financial institution. In other embodiments, the user 102 may be associated with another system or entity, such as third party system 105, which may be granted access to the non-contact authorization system 108 or entity system 106 in some embodiments.

FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to various data from the system 108, or transmission of various data to the system 108. The processing device 114 is operatively coupled to the communication device 112 and the memory device 116. The processing device 114 uses the communication device 112 to communicate with the network 101 and other devices on the network 101, such as, but not limited to, the entity system 106, the non-contact authorization system 108 and the third party system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the non-contact authorization system 108 and/or the entity system 106 are configured to cause the processing device 114 to execute the computer readable instructions 110, thereby causing the user device 104 to perform one or more functions described herein, for example, via the user application 122 and the associated user interface.

As further illustrated in FIG. 1, the non-contact authorization system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, based on computer-readable instructions thereof, which may be stored in a memory device, for example, executing computer readable instructions 154 or computer-readable program code 154 stored in memory device 150 to perform one or more functions associated with the non-contact authorization system 108.

The processing device 148 is operatively coupled to the communication device 146 and the memory device 150. The processing device 148 uses the communication device 146 to communicate with the network 101 and other devices on the network 101, such as, but not limited to the entity system 106, the third party system 105, and the user system 104. As such, the communication device 146 generally comprises a modem, server, or other device for communicating with other devices on the network 101.

As further illustrated in FIG. 1, the non-contact authorization system 108 comprises the computer-readable instructions 154 stored in the memory device 150, which in one embodiment includes the computer-readable instructions for the implementation of a convolutional neural network model ("CNN model") 156. In some embodiments, the computer readable instructions 154 comprise executable instructions associated with the CNN model 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the CNN model 156 and its components/modules. The CNN model 156 is further configured to perform or cause other systems and devices to perform the various steps in processing software code, and organizing data as will be described in detail later on.

As such, the processing device 148 is configured to perform some or all of the data processing and event capture, transformation and analysis steps described throughout this disclosure, for example, by executing the computer readable instructions 154. In this regard, the processing device 148 may perform one or more steps singularly and/or transmit control instructions that are configured to the CNN model 156, entity system 106, user device 104, and third party system 105 and/or other systems and applications, to perform one or more steps described throughout this disclosure. Although various data processing steps may be described as being performed by the CNN model 156 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the non-contact authorization system 108 may include multiple systems, servers, computers or the like maintained by one or many entities. FIG. 1 merely illustrates one of those systems 108 that, typically, interacts with many other similar systems to form the information network. In one embodiment of the invention, the non-contact authorization system 108 is operated by the entity associated with the entity system 106, while in another embodiment it is operated by a second entity that is a different or separate entity from the entity system 106. In some embodiments, the entity system 106 may be part of the non-contact authorization system 108. Similarly, in some embodiments, the non-contact authorization system 108 is part of the entity system 106. In other embodiments, the entity system 106 is distinct from the non-contact authorization system 108.

In one embodiment of the non-contact authorization system 108, the memory device 150 stores, but is not limited to, the CNN model 156. In one embodiment of the invention, the CNN model 156 may associated with computer-executable program code that instructs the processing device 148 to operate the communication device 146 to perform certain communication functions involving the third party system 105, the user device 104 and/or the entity system 106, as described herein. In one embodiment, the computer-executable program code of an application associated with the CNN model 156 may also instruct the processing device 148 to perform certain logic, data processing, and data storing functions of the application.

The processing device 148 is configured to use the communication device 146 to receive data, such as images, or metadata associated with images, transmit and/or cause display of extracted data and the like. In the embodiment illustrated in FIG. 1 and described throughout much of this specification, the CNN model 156 may perform one or more of the functions described herein, by the processing device 148 executing computer readable instructions 154 and/or executing computer readable instructions associated with one or more application(s)/devices/components of the CNN model 156.

As illustrated in FIG. 1, the entity system 106 is connected to the non-contact authorization system 108 and may be associated with a financial institution network. In this way, while only one entity system 106 is illustrated in FIG. 1, it is understood that multiple network systems may make up the system environment 100 and be connected to the network 101. The entity system 106 generally comprises a communication device 136, a processing device 138, and a memory device 140. The entity system 106 comprises computer-readable instructions 142 stored in the memory device 140, which in one embodiment includes the computer-readable instructions 142 of an institution application 144. The entity system 106 may communicate with the non-contact authorization system 108. The non-contact authorization system 108 may communicate with the entity system 106 via a secure connection generated for secure encrypted communications between the two systems for communicating data for processing across various applications.

As further illustrated in FIG. 1, in some embodiments, the non-contact authorization system environment 100 further comprises a third party system 105, in operative communication with the non-contact authorization system 108, the entity system 106, and/or the user device 104. Typically, the third party system 105 comprises a communication device, a processing device and memory device with computer readable instructions. In some instances, the third party system 105 comprises a first database/repository comprising software code or program component objects, and/or a second database/repository comprising functional source code associated with software or program component objects and attributes. These applications/databases may be operated by the processor executing the computer readable instructions associated with the third party system 105, as described previously. Although a single external third party system 105 is illustrated, it should be understood that, the third party system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a non-contact authorization verification process 200, in accordance with one embodiment of the present invention. As shown in block 202, the process begins by initially verifying a user access credential via the user device 104. For instance, in the case of an ATM interaction or point of sale (POS) interaction, the user may insert or tap a card (such as a credit cart, debit cart, ID card, or the like), or other verification credential into or around the user device 104 in order to initiate the authorization and verification process 200. Next, the system generates and displays a user prompt for a gesture, as shown in block 204, and simultaneously initiates data collection via one or more device sensors, as shown in block 206. In some embodiments, the initiation of data collection via one or more device sensors may actually begin prior to the generation of display of a user prompt. For instance, in some embodiments, the user device 104 may contain one or more proximity sensors that recognize a user approaching the user device 104 and immediately initiate data collection via one or cameras, video cameras, infrared sensors, or the like, as soon as the user is within a certain proximity of the user device 104. In some embodiments, data collected during this process is stored in a secure user configuration associated with the user as a part of the data repository 160. In some embodiments, the user may be identified via the collected imaging data, such as via a facial recognition process powered by the CNN model 156. In other embodiments, the user may be initially identified using the provided verification credential inserted into the user device 104. Once the user is identified, the system may locate a previously generated user configuration for the user stored in the data repository 160, and may store collected data in an encrypted format in the user configuration for later reference and analysis (e.g., the system may conduct various analyses on collected user interaction data related to their movements, gait, gestures, mannerisms, appearance, or the like, which can be later used to verify the user's identity and keep their resource accounts secure from unauthorized access).

As shown in blocks 208 and 210, the system may then either validate user input, or reject user input, respectively, based on the response of the user to the generated gesture prompt. For instance, in some embodiments, the ATM or POS device may include a keypad. In some embodiments, the generated gesture prompt may include a request for the user to gesture as if they were pressing the keypad to enter a personal identification number (PIN) code, which may include a series of alphanumeric characters of any length. For instance, the user may hover their fingers and hands over the keypad and mimic a typing gesture that would coincide with entering their PIN code. In some embodiments, the ATM or POS device may include one or more cameras aimed at the keypad and able to capture information showing where the user's fingers and hands are located relative to the keypad. In other embodiments, a series of proximity sensors may be used underneath the keypad to determine where the user's fingers and hands are located relative to the keypad. In still further embodiments, the keypad may be generated on a screen of the user device, such as a virtual keypad or keyboard shown on a display of the ATM or POS device. In this instance, the virtually rendered keyboard or keypad shown on the display of the user device may be dynamically altered in real time in response to the user's gestures. For instance, the keypad or keyboard may be animated to show certain keys, characters, or numbers being "depressed" on the virtual keyboard (e.g., via the indication of a change in color, shade, shape, or the like, of certain keys that the system recognizes as being pressed by the user). In this way, the user may receive real time feedback as to where their hands and fingers are being registered relative to the user device. In other embodiments, in addition or in lieu of the virtual keypad or keyboard, the ATM or POS device may also generate numbers or a sequence of asterisks on the screen in order to simply indicate how many characters or numbers have been registered as being pressed at any given time. If the user input is validated, the system may process one or more resource activities (e.g., authorize a resource transfer via the POS device), or display a number of resource activity options (e.g., generate a menu of options for the user via the ATM device).

In the event that the user input is rejected, as indicated in block 210, the system may attempt to rectify a possible system error by repeating the gestured entry process in conjunction with a simultaneous recalibration event. It is understood that users may vary in their perception of where the keypad is located in relation to their hands and fingers which may lead to a range of user gestures that the system must discern in order to accurately calibrate associated device sensors, cameras, or the like, in order to accurately read user gesture input. The system may generate an additional display prompt for the user gesture, and reset the gesture collection process, as indicated in block 214. Next, as indicated in block 216, the system may repeat data collection via the one or more device sensors of user device 104. As the user enters their PIN code, the system may attempt to apply a slightly altered or different CNN model 156 algorithm in order to discern the user gesture input. If the user gesture input is validated, the system may proceed to validate the user input, as shown in block 218. Given that the user gesture input may differ slightly for each user, the system may store unique gesture pattern data for the user in a user configuration as a part of data repository 160. In some embodiments, the system may use the one or more sensors of user device 104, such as infrared or proximity sensors, in order to triangulate the user's height and predicted gaze relative to the keypad of the user device 104. In this way, the system may be able to discern the user's height attribute which may be play a factor in calibrating the user gesture recognition during user gesture input. For instance, if the user's height is relatively short, the system may predict that the user's gesture input may be skewed upwards, as the angle of view toward the virtual keypad may be off-axis, causing the user to skew their gesture input to the upward direction relative to the vertical axis of the keypad. In other embodiments, the user's relatively tall height may have an opposite effect that the system can calibrate for ahead of time.

In some embodiments, when the system rejects user input as indicated in block 210, or if the user suspects that they have accidentally entered the wrong PIN code, the system may allow the user to gesture in a specific manner in order to restart the gesture input process. For instance, when generating the display of user prompt for user gesture input, the system may also generate text or animations on the display to indicate that waving the user's hand over the keypad area will cause the gesture input process to reset and start from the beginning of the data capture process. For instance, if the system detects that the user waves their hand over the keypad to the left or right, the system may generate a display to indicate that the previous gesture input data has been cleared by backspacing or removing any characters on the display. In this way, the user may conveniently start the process of PIN code entry over again without the need to physically touch the user device 104, repeatedly press a backspace button, "clear" button, or the like. Given that users may not be familiar with the user gesture input process initially, or that the system may not have calibrated for the specific user yet, this allows the user an easy and intuitive way to start the process again if user gesture entry is not accurate on the first attempt.

FIG. 3 depicts a process flow 300 for user resource activity interaction, in accordance with one embodiment of the present invention. As shown in block 302, the process begins whereby the system scans a user credential (e.g., credit card, debit card, other payment instrument, or the like), via the user device 104, and locates a user configuration or one or more resource accounts associated with the user or the credential in datastore 160. Once the user configuration and associated resource accounts are located, the system causes the user device 104 to display a user gesture input prompt, and, in some instances, a virtual keypad, if necessary, as shown in block 304. For instance, the user device 104 may display a prompt with a visual, auditory, or textual communication that instructs the user to perform a series of touchless gestures toward a physical or virtual keypad in order to enter their PIN code.

During display of the user gesture input prompt, the system simultaneously initiates one or more user device proximity and image capture sensors, as shown in block 306. As discussed with regard to FIGS. 1 and 2, the user device 104 may contain various sensors that track user movement and proximity to the user device 104, and the keypad of the device in particular. For instance, the user device 104, whether an ATM or POS device, may contain a chip or series of proximity chips underneath a physical keypad that track proximity of the user's hands and fingers across the vertical and horizontal coordinates of the keypad, and may use this data to determine which keys the user is gesturing toward in the process of entering their PIN code. In other embodiments, the user device 104 may employ one or more image sensors above or around the keypad in order to collect imaging data that can be analyzed in sequence to determine user gesture input. For instance, the system may reference two image capture sequences in conjunction, one being a top-view camera sensor above the keypad, and one being a side-view camera sensor parallel with the keypad. The top view camera sensor may indicate vertical and horizonal coordinates of alphanumeric characters on the keypad associated with the user gesture input, while the side-view camera sensor may measure a z-axis where the user's fingers are recognized as gesturing a "tapping" or movement toward the keypad. By cross referencing data from the two camera angles and aligning this data in the same timestamp sequence, the system may determine the order of keys that the user gesture input indicates. In some embodiments, the system may reference such data to increase the confidence in received proximity sensor data from the keypad.

The process continues at block 308, wherein the system may display an option to reset the user gesture input process via a specific waving gesture. For instance, the display might be programmed to show an animation of a hand waving over the keypad, or may display text describing that the user may wave their hand over the keypad to reset the gesture process. In this way, using the sensors described above, the system may detect that the user has instructed the system to reset the PIN code entry process via a hand wave gesture over the surface of the keypad area. As shown in block 310, the system may either validate or reject the user gesture input. If the user gesture input is rejected, the system may automatically reset the user gesture input process and attempt to recalibrate user device sensors in order to account for the user's particular mannerisms, attributes, or the like, as described in FIG. 2. If the system can validate the user gesture input as valid, the system may complete a resource activity (e.g., process a transaction via a POS device), or display a menu of one or more options for various resource activities (e.g., check balance, withdraw resources, or the like, via an ATM device), as shown in block 312.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for performing non-contact authorization verification, the system comprising:
   a memory device; and
   a processing device operatively coupled to the memory device, wherein the processing device is configured to execute computer-readable program code to:
      detect, via one or more proximity sensors of a user device, comprising an automated teller machine, a user approaching the automated teller machine, wherein the automated teller machine comprises a numerical keypad;
      in response to determining that the user is within a predetermined proximity of the automated teller machine, initiate one or more data capture sensors comprising video sensors, camera sensors, and infrared sensors associated with the automated teller machine;
      extract imaging data from the one or more data capture sensors, and store the imaging data in a secure user configuration associated with the user at a data repository in an encrypted format;
      identify the user based in the imaging data prior to insertion of a resource instrument by the user at the automated teller machine;
      scan the resource instrument to determine a resource account number and associated user identity;
      transmit instructions to the automated teller machine to cause the automated teller machine to display a user gesture input prompt;
      simultaneous with the display of the user gesture input prompt, activate the one or more data capture sensors on the automated teller machine, wherein the one or more data capture sensors are configured to detect one or more non-contact user gestures and comprise the one or more proximity sensors positioned underneath the numerical keypad;
      detect, via the one or more proximity sensors, the one or more non-contact user gestures, where each of the one or more non-contact user gestures is associated with a position with respect to the numerical keypad;
      using a convolutional neural network (CNN) at a non-contact authorization system, validate or reject the one or more detected non-contact user gestures, comprising:
         rejecting user input of the one or more non-contact user gestures based on analyzing the user input with respect to the user gesture input prompt;
         rectifying a possible system error by (i) repeating the user gesture input prompt, and (ii) simultaneously initiate a recalibration event; and
         customizing a calibration of user gesture recognition of the one or more data capture sensors to the user, based on at least (i) triangulating a user height attribute and user gaze attribute relative to the numerical keypad; and
      based on a validation of the user gesture input, process one or more resource activities.

2. The system of claim 1, wherein customizing the calibration of the user gesture recognition of the one or more data capture sensors of the automated teller machine further comprises adjusting a skew or angle of view associated with the user input.

3. The system of claim 1, wherein the processing device is configured to execute computer-readable program code to:
   display, via a display device of the automated teller machine, a virtually rendered keyboard or keypad; and
   dynamically alter, the display of the virtually rendered keyboard or keypad, in response to detecting the one or more non-contact user gestures.

4. The system of claim 1, wherein the one or more proximity sensors coincide with horizontal and vertical axis coordinates of a single alphanumeric character of the numerical keypad, wherein the processing device is configured to execute computer-readable program code to:
   analyze in sequence, the one or more non-contact user gestures detected by the one or more data capture sensors, comprising:
      detecting, via a top-view camara sensor of the one or more data capture sensors, a first image capture sequence comprising vertical and horizontal coordinates associated with the one or more non-contact user gestures, wherein the top-view camara sensor is located above the numerical keypad;
      detecting, via a side-view camara sensor of the one or more data capture sensors, a second image capture sequence comprising a z-axis measurement associated with the one or more non-contact user gestures, wherein the side-view camara sensor is located in parallel with the numerical keypad; and
      cross-referencing the first image capture sequence and the second image capture sequence by aligning the first image capture sequence and the second image capture sequence in a time stamp sequence, to determine an order of keys associated with the one or more non-contact user gestures.

5. The system of claim 1, further configured to store user gesture input data in the secure user configuration associated with the resource account number and the user identity.

6. A computer program product for performing non-contact authorization verification, the computer program product comprising at least one non-transitory computer readable medium comprising computer readable instructions for:
   detecting via one or more proximity sensors of a user device comprising an automated teller machine, a user approaching the automated teller machine, wherein the automated teller machine comprises a numerical keypad;
   in response to determining that the user is within a predetermined proximity of the automated teller machine, initiating one or more data capture sensors comprising video sensors, camera sensors, and infrared sensors associated with the automated teller machine;
   extracting imaging data from the one or more data capture sensors, and storing the imaging data in a secure user configuration associated with the user at a data repository in an encrypted format:
   identifying the user based in the imaging data prior to insertion of a resource instrument by the user at the automated teller machine;
   scanning the resource instrument to determine a resource account number and associated user identity;
   transmitting instructions to the automated teller machine to cause the automated teller machine to display a user gesture input prompt;
   simultaneous with the display of the user gesture input prompt, activating the one or more data capture sensors on the automated teller machine, wherein the one or more data capture sensors are configured to detect one or more non-contact user gestures and comprise the one or more proximity sensors positioned underneath the numerical keypad;
   detecting, via the one or more proximity sensors, the one or more non-contact user gestures, where each of the one or more non-contact user gestures is associated with a position with respect to the numerical keypad;
   using a convolutional neural network (CNN) at a non-contact authorization system, validating or rejecting the one or more detected non-contact user gestures, comprising:
      rejecting user input of the one or more non-contact user gestures based on analyzing the user input with respect to the user gesture input prompt;
      rectifying a possible system error by (i) repeating the user gesture input prompt, and (ii) simultaneously initiate a recalibration event; and
      customizing a calibration of user gesture recognition of the one or more data capture sensors to the user, based on at least (i) triangulating a user height attribute and user gaze attribute relative to the numerical keypad; and
   based on a validation of the user gesture input, processing one or more resource activities.

7. The computer program product of claim 6, wherein customizing the calibration of the user gesture recognition of the one or more data capture sensors of the automated teller machine further comprises adjusting a skew or angle of view associated with the user input.

8. The computer program product of claim 6, wherein the at least one non-transitory computer readable medium further comprises computer readable instructions for:
   displaying, via a display device of the automated teller machine, a virtually rendered keyboard or keypad; and
   dynamically altering, the display of the virtually rendered keyboard or keypad, in response to detecting the one or more non-contact user gestures.

9. The computer program product of claim 6, wherein the one or more proximity sensors coincide with horizontal and vertical axis coordinates of a single alphanumeric character of the numerical keypad, wherein the at least one non-transitory computer readable medium further comprises computer readable instructions for:
   analyzing in sequence, the one or more non-contact user gestures detected by the one or more data capture sensors, comprising:
      detecting, via a top-view camara sensor of the one or more data capture sensors, a first image capture sequence comprising vertical and horizontal coordinates associated with the one or more non-contact user gestures, wherein the top-view camara sensor is located above the numerical keypad;
      detecting, via a side-view camara sensor of the one or more data capture sensors, a second image capture sequence comprising a z-axis measurement associated with the one or more non-contact user gestures, wherein the side-view camara sensor is located in parallel with the numerical keypad; and
      cross-referencing the first image capture sequence and the second image capture sequence by aligning the first image capture sequence and the second image capture sequence in a time stamp sequence, to determine an order of keys associated with the one or more non-contact user gestures.

10. The computer program product of claim 6, further configured to store user gesture input data in the secure user configuration associated with the resource account number and the user identity.

11. A computer implemented method for a performing non-contact authorization verification, said computer implemented method comprising:
   detecting, via one or more proximity sensors of a user device comprising an automated teller machine, a user approaching the automated teller machine, wherein the automated teller machine comprises a numerical keypad;
   in response to determining that the user is within a predetermined proximity of the automated teller machine, initiating one or more data capture sensors comprising video sensors, camera sensors, and infrared sensors associated with the automated teller machine;
   extracting imaging data from the one or more data capture sensors, and storing the imaging data in a secure user configuration associated with the user at a data repository in an encrypted format;
   identifying the user based in the imaging data prior to insertion of a resource instrument by the user at the automated teller machine;
   scanning the resource instrument to determine a resource account number and associated user identity;
   transmitting instructions to the automated teller machine to cause the automated teller machine to display a user gesture input prompt;
   simultaneous with the display of the user gesture input prompt, activating the one or more data capture sensors on the automated teller machine, wherein the one or more data capture sensors are configured to detect one or more non-contact user gestures and comprise theone or more proximity sensors positioned underneath the numerical keypad;
   detecting, via the one or more proximity sensors, the one or more non-contact user gestures, where each of the one or more non-contact user gestures is associated with a position with respect to the numerical keypad;
   using a convolutional neural network (CNN) at a non-contact authorization system, validating or rejecting the one or more detected non-contact user gestures, comprising:
      rejecting user input of the one or more non-contact user gestures based on analyzing the user input with respect to the user gesture input prompt;
      rectifying a possible system error by (i) repeating the user gesture input prompt, and (ii) simultaneously initiate a recalibration event; and
      customizing a calibration of user gesture recognition of the one or more data capture sensors to the user, based on at least (i) triangulating a user height attribute and user gaze attribute relative to the numerical keypad; and
   based on a validation of the user gesture input, processing one or more resource activities.

12. The computer implemented method of claim 11, wherein customizing the calibration of the user gesture recognition of the one or more data capture sensors of the automated teller machine further comprises adjusting a skew or angle of view associated with the user input.

13. The computer implemented method of claim 11, wherein the method further comprises:
   displaying, via a display device of the automated teller machine, a virtually rendered keyboard or keypad; and
   dynamically altering, the display of the virtually rendered keyboard or keypad, in response to detecting the one or more non-contact user gestures.

14. The computer implemented method of claim 11, wherein the one or more proximity sensors coincide with horizontal and vertical axis coordinates of a single alphanumeric character of the numerical keypad, wherein the method further comprises:
   analyzing in sequence, the one or more non-contact user gestures detected by the one or more data capture sensors, comprising:
      detecting, via a top-view camara sensor of the one or more data capture sensors. a first image capture sequence comprising vertical and horizontal coordinates associated with the one or more non-contact user gestures, wherein the top-view camara sensor is located above the numerical keypad;
      detecting, via a side-view camara sensor of the one or more data capture sensors, a second image capture sequence comprising a z-axis measurement associated with the one or more non-contact user gestures, wherein the side-view camara sensor is located in parallel with the numerical keypad; and
      cross-referencing the first image capture sequence and the second image capture sequence by aligning the first image capture sequence and the second image capture sequence in a time stamp sequence, to determine an order of keys associated with the one or more non-contact user gestures.

15. The system of claim 1, wherein simultaneously initiating the recalibration event further comprises applying an altered convolutional neural network (CNN) model to validate or reject the one or more detected non-contact user gestures.

16. The system of claim 1, wherein the processing device is configured to execute computer-readable program code to: display, via a display device of the automated teller machine, an option to reset the user gesture input via a predetermined waving gesture.

17. The computer program product of claim 6, wherein simultaneously initiating the recalibration event further comprises applying an altered convolutional neural network (CNN) model to validate or reject the one or more detected non-contact user gestures.

18. The computer program product of claim 6, wherein the at least one non-transitory computer readable medium further comprises computer readable instructions for: displaying, via a display device of the automated teller machine, an option to reset the user gesture input via a predetermined waving gesture.

19. The computer implemented method of claim 11, wherein simultaneously initiating the recalibration event further comprises applying an altered convolutional neural network (CNN) model to validate or reject the one or more detected non-contact user gestures.

20. The computer implemented method of claim 11, wherein the method further comprises: displaying, via a display device of the automated teller machine, an option to reset the user gesture input via a predetermined waving gesture.

* * * * *